(12) United States Patent
Shin

(10) Patent No.: US 11,745,587 B2
(45) Date of Patent: Sep. 5, 2023

(54) HEAD-UP DISPLAY APPARATUS AND MANUFACTURING METHOD THEREFOR

(71) Applicant: HYUNDAI MOBIS CO., LTD., Seoul (KR)

(72) Inventor: Yu Jin Shin, Seongnam-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 157 days.

(21) Appl. No.: 17/475,382

(22) Filed: Sep. 15, 2021

(65) Prior Publication Data
US 2022/0111729 A1    Apr. 14, 2022

(30) Foreign Application Priority Data

Oct. 13, 2020  (KR) .................. 10-2020-0132227

(51) Int. Cl.
| | |
|---|---|
| G02B 27/01 | (2006.01) |
| B60K 35/00 | (2006.01) |
| G02B 5/10 | (2006.01) |
| G02B 7/182 | (2021.01) |

(52) U.S. Cl.
CPC ............. *B60K 35/00* (2013.01); *G02B 5/10* (2013.01); *G02B 7/1821* (2013.01); *B60K 2370/1529* (2019.05); *B60K 2370/816* (2019.05)

(58) Field of Classification Search
CPC .. G02B 27/0149; G02B 7/1821; B60K 35/00; B60K 2370/1529
See application file for complete search history.

(56) References Cited

U.S. PATENT DOCUMENTS

2020/0338944 A1* 10/2020 Henon ...................... B60R 1/02
2021/0191121 A1*  6/2021 Kim .................. G02B 27/0149

* cited by examiner

*Primary Examiner* — Ryan D Howard
(74) *Attorney, Agent, or Firm* — DLA PIPER LLP (US)

(57) ABSTRACT

According to at least one aspect, the present disclosure provides a vehicle head-up display apparatus comprising: a lower case; an aspherical mirror including spherical mounts formed at both ends of the aspherical mirror; a plurality of reception blocks included in the lower case to seat the spherical mounts so that the aspherical mirror is rotatable, and formed to have a shape corresponding to each spherical mount so that a clearance with the spherical mount does not occur; at least one mount fixing unit surrounding at least a portion of the spherical mount in a state where the spherical mount is seated on each of the plurality of reception blocks to limit a displacement of the spherical mount by a predetermined fixing force; and a screen including a coupling hole for coupling with the mount fixing unit and coupled to the lower case.

17 Claims, 8 Drawing Sheets

(a)

(b)

(a)

(b)

(a)

(b)

HEAD-UP DISPLAY APPARATUS AND MANUFACTURING METHOD THEREFOR

CROSS-REFERENCE TO RELATED APPLICATION

This application claims priority to and the benefit of Korean Patent Application No. 10-2020-0132227, filed on Oct. 13, 2020, the disclosure of which is incorporated herein by reference in its entirety.

BACKGROUND

Field of the Invention

The present disclosure relates to a vehicle head-up display apparatus and a manufacturing method therefor. More specifically, the present disclosure relates to a vehicle head-up display apparatus, in which the configuration and position of an axis of rotation of an aspherical mirror used in a head-up display are optimized, and a manufacturing method therefor.

Discussion of Related Art

Contents described here merely provide background information for the present disclosure and do not constitute the related art.

Recently, the automobile market is developing toward a preference for intelligent cars equipped with advanced information technology (IT). In particular, products that support driving stability and driver convenience are being released, and among them, a vehicle head-up display (HUD) is attracting attention.

The head-up display is an apparatus that displays an image including a vehicle speed, a fuel remaining amount, road guidance information, or the like on a windshield which is a front window of a vehicle. In general, the head-up display apparatus reflects head-up display information projected from a picture generation unit (PGU) through an aspherical mirror and displays the reflected head-up display information on the windshield. In addition, when a driver's eye level changes, a height of information displayed on the windshield is consequently adjusted by rotating the aspherical mirror to adjust a reflection angle of the aspherical mirror.

However, when the aspherical mirror rotates, an axis of rotation may be changed due to vibrations or external impacts caused by driving, which causes the position of information displayed on the windshield to be changed or out of focus.

As the related art for solving this problem, there is a "head-up display apparatus" described in JP 2017-099314 and the like.

However, despite these related technologies, there is still a problem that a clearance may occur in a fixed portion of the aspherical mirror when a large external force is applied to the aspherical mirror. In addition, when a plurality of parts are used to fix the aspherical mirror, there is a problem in that manufacturing costs increase.

SUMMARY OF THE INVENTION

Accordingly, the present disclosure is directed to providing a vehicle head-up display apparatus, in which an axis of rotation of an aspherical mirror is fixed and a configuration for fixing the aspherical mirror is optimized to prevent a clearance from occurring in a fixed portion of the aspherical mirror and the total number of parts of the head-up display apparatus is reduced to reduce costs, and a manufacturing method therefor.

According to at least one aspect, the present disclosure provides a vehicle head-up display apparatus comprising: a lower case; an aspherical mirror including spherical mounts formed at both ends of the aspherical mirror; a plurality of reception blocks included in the lower case to seat the spherical mounts so that the aspherical mirror is rotatable, and formed to have a shape corresponding to each spherical mount so that a clearance with the spherical mount does not occur; at least one mount fixing unit surrounding at least a portion of the spherical mount in a state where the spherical mount is seated on each of the plurality of reception blocks to limit a displacement of the spherical mount by a predetermined fixing force; and a screen including a coupling hole for coupling with the mount fixing unit and coupled to the lower case.

According to another aspect, the present disclosure provides a method of manufacturing a vehicle head-up display apparatus, the method comprising: forming spherical mounts at both ends of a spherical mirror so that the aspherical mirror is attached to a lower case and rotatable; forming, in a lower case, a plurality of reception blocks having a shape corresponding to each spherical mount so that a clearance with the spherical mount does not occur; seating the spherical mounts on the plurality of reception blocks; coupling at least one mount fixing unit surrounding at least a portion of the spherical mount in a state where the spherical mount is seated on each of the plurality of reception blocks to limit a displacement of the spherical mount by a predetermined fixing force to a coupling hole provided in a screen; and coupling the screen coupled to the mount fixing unit to the lower case.

REFERENCE NUMERICALS

Figure 1:
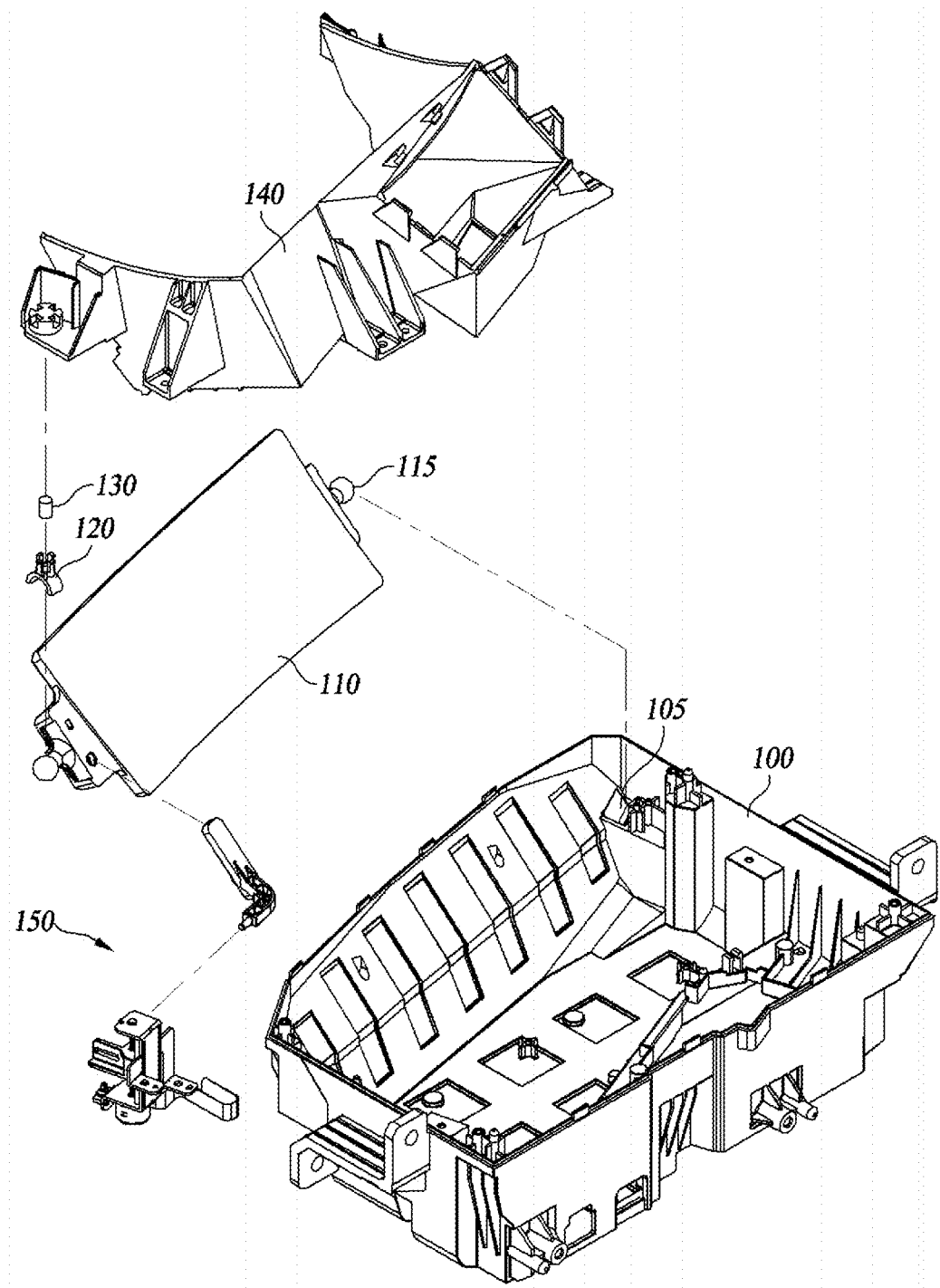
FIG. 1 is an exploded view of some parts of a vehicle head-up display apparatus according to one embodiment of the present disclosure.

| | |
|---|---|
| 100: lower case | 105: reception blocks |
| 110: aspherical mirror | 115: spherical mounts |
| 120: mount fixing unit | 130: compression spring |
| 140: screen | 150: driving unit |
| 200: coupling hole | 220: push unit |
| 300: X-axis reference plane | 320: vertical fastening groove |
| 340: support unit | 500: first reception block |
| 600: second reception block | 700: fixing hook |
| 720: protruding unit | 900: step motor |
| 920: lead screw | 940: rotation link unit |
| 942: first link | 944: second link |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is an exploded view of some parts of a vehicle head-up display apparatus according to one embodiment of the present disclosure.

Figure 2:
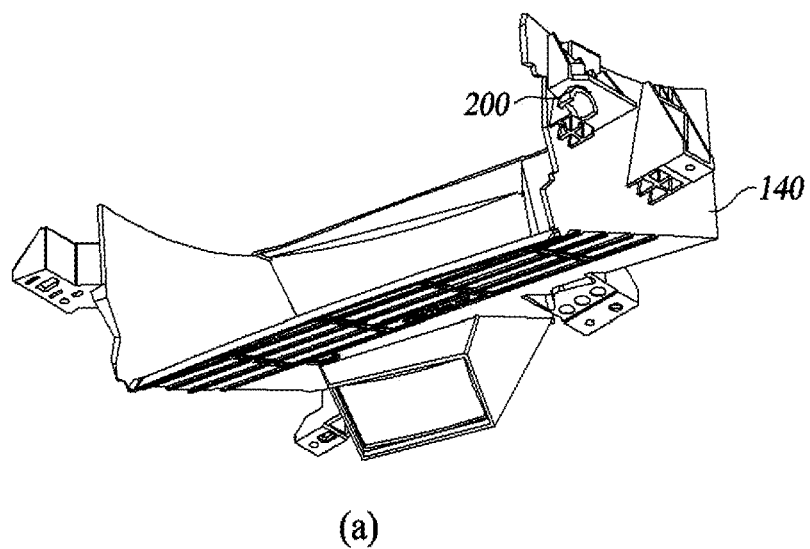
FIG. 2 is a view illustrating an example in which a mount fixing unit is coupled to a screen according to one embodiment of the present disclosure.
Figure 2:
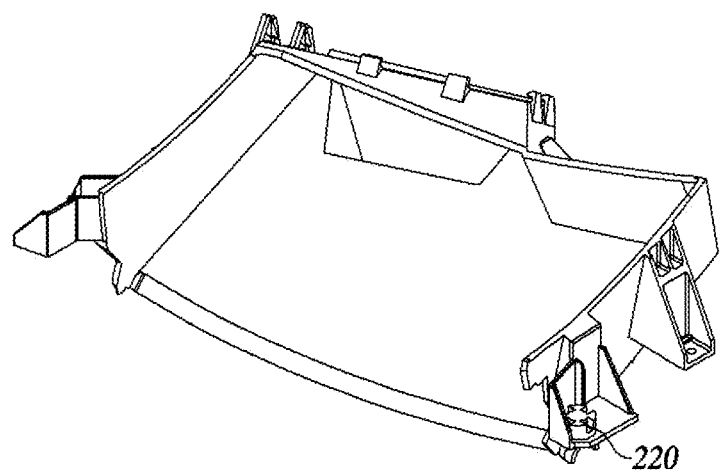

FIG. 2 is a view illustrating an example in which a mount fixing unit 120 is coupled to a screen 140 according to one embodiment of the present disclosure.

Referring to FIGS. 1 and 2, a vehicle head-up display apparatus according to one embodiment of the present disclosure includes all or some of a lower case 100, an aspherical mirror 110, a plurality of reception blocks 105, the screen 140, the mount fixing unit 120, a compression spring 130, a driving unit 150, and a control unit (not illustrated).

The lower case 100 is mounted inside the vehicle, supports a lower portion of the aspherical mirror 110, and serves to protect the aspherical mirror 110 from an external impact.

Spherical mounts 115 are formed at both ends of the aspherical mirror 110. That is, each of the spherical mounts 115 is attached to the lower case 100, has a spherical shape so as to be rotatable, and is formed at one of both ends of the aspherical mirror 110.

The plurality of reception blocks 105 are included in the lower case 100, and the spherical mounts 115 are seated on the reception blocks 105 so that the aspherical mirror 110 is rotatable. In order to seat the spherical mount 115, the plurality of reception blocks 105 may be disposed on both sides of the lower case 100 and below the spherical mount 115.

The mount fixing unit 120 surrounds at least a portion of the spherical mount 115 in a state in which the spherical mount 115 is seated on the plurality of reception blocks 105, and limits a displacement of the spherical mount 115 by a predetermined fixing force. This is to prevent the axis of rotation of the aspherical mirror 110 from shaking or the spherical mount 115 from being separated from the plurality of reception blocks 105 when the aspherical mirror 110 rotates.

In FIG. 1, since movement of the spherical mount 115 on a side where the driving unit 150 is located may occur most severely, the mount fixing unit 120 surrounds at least a portion of only the spherical mount 115, on the side where the driving unit 150 is located, of the spherical mounts 115 formed at both ends of the aspherical mirror 110. However, the present disclosure is not necessarily limited thereto, and two mount fixing units 120 may surround at least a portion of each of the two spherical mounts 115.

Meanwhile, the predetermined fixing force for limiting the displacement of the spherical mount 115 may be generated by coupling the screen 140 with the lower case 100. Accordingly, the screen 140 is coupled to the lower case 100. In addition, the screen 140 includes a coupling hole 200 for coupling with the mount fixing unit 120. That is, the mount fixing unit 120 may be coupled to the coupling hole 200 of the screen 140, and the screen 140 to which the mount fixing unit 120 is coupled may be coupled to the lower case 100. Meanwhile, the mount fixing unit 120 may be fitted to the coupling hole 200 but is not necessarily limited thereto.

When the screen 140 is coupled to the lower case 100, the mount fixing unit 120 is positioned above the spherical mount 115, the screen 140 is coupled to the lower case 100, and thus, the mount fixing unit 120 presses the spherical mount 115 from above. For example, the screen 140 may include a push unit 220 disposed above the mount fixing unit 120 and the coupling hole 200, and when the screen 140 is coupled to the lower case 100, the push unit 220 may press the mount fixing unit 120 from above. The mount fixing unit 120 presses the spherical mount 115 as much as the push unit 220 presses the mount fixing unit 120.

When the mount fixing unit 120 presses the spherical mount 115 from above, a predetermined fixing force is generated, and the displacement of the spherical mount 115 can be limited using the fixing force. Accordingly, in the head-up display apparatus according to one embodiment of the present disclosure, it is possible to prevent a clearance from occurring in a fixed portion of the aspherical mirror 110 by limiting the displacement of the spherical mount 115.

The compression spring 130 is attached to the mount fixing unit 120 and compressed as the screen 140 is coupled to the lower case 100. When the vehicle head-up display apparatus according to one embodiment of the present disclosure includes the compression spring 130, the mount fixing unit 120 limits the displacement of the spherical mount 115 using an elastic force generated by compressing the compression spring 130.

Meanwhile, in general, the head-up display apparatus reflects a head-up display image projected from a picture generation unit (PGU) (not illustrated) to the aspherical mirror 110 using a folding mirror (not illustrated) and displays the image reflected by the aspherical mirror 110 on a windshield (not illustrated). In this case, the folding mirror may be coupled to one surface of the screen 140. However, the PGU may be configured so that the head-up display image is directly projected onto the aspherical mirror 110, and the reflected head-up display image is displayed on the windshield using the aspherical mirror 110.

In a case where a driver's eye level is changed when the head-up display image is displayed on the windshield, it is preferable that a position at which the head-up display information is displayed is changed according to the driver's eye level. Accordingly, the driving unit 150 is connected to the lower case 100 and the aspherical mirror 110 to rotate the aspherical mirror 110. In addition, the control unit controls the driving unit 150 to change a display position of the head-up display information. The vehicle head-up display apparatus according to one embodiment of the present disclosure can adjust the position where the image is reflected on the windshield by appropriately rotating the aspherical mirror 110 according to the driver's eye level using the driving unit 150 and the control unit.

Hereinafter, the configuration and function of each component will be described in detail with reference to related drawings.

Figure 3:
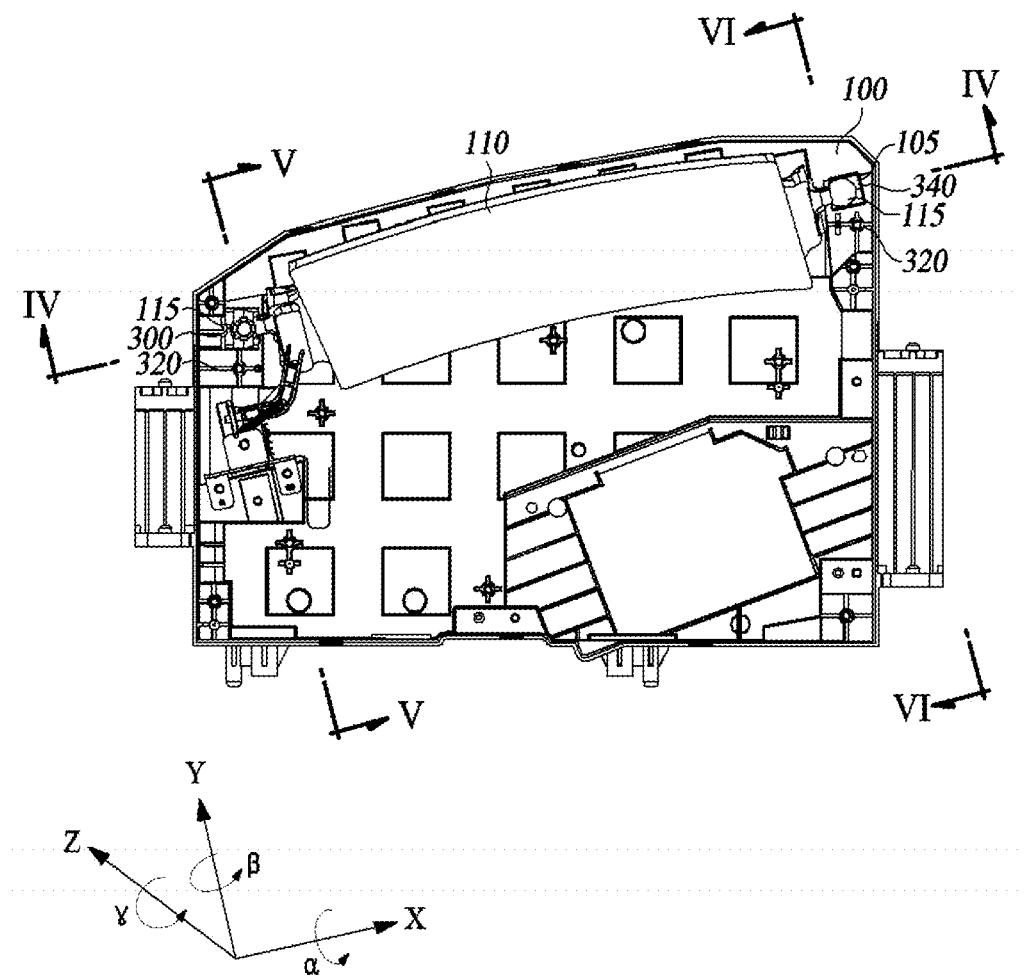
FIG. 3 is a view illustrating an example in which an aspherical mirror is attached to a lower case according to one embodiment of the present disclosure.

FIG. 3 is a view illustrating an example in which the aspherical mirror 110 is attached to the lower case 100 according to one embodiment of the present disclosure.

Figure 4:
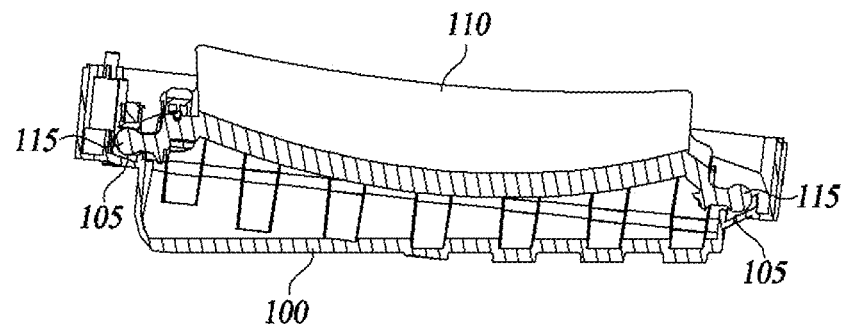
FIG. 4 is a cross-sectional view of the lower case and the aspherical mirror in FIG. 3 taken along line IV-IV in a direction of an axis of rotation of the aspherical mirror.

FIG. 4 is a cross-sectional view of the lower case 100 and the aspherical mirror 110 in FIG. 3 taken along line IV-IV in a direction of the axis of rotation of the aspherical mirror 110.

Figure 5:
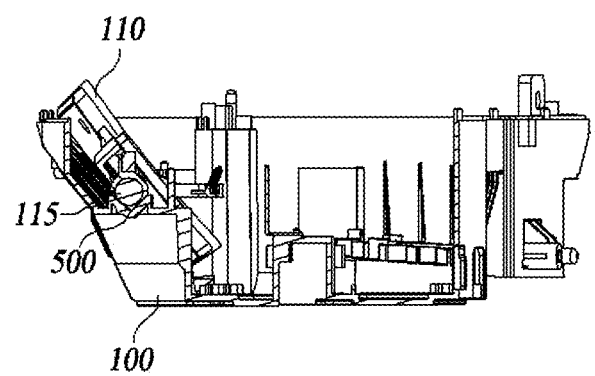
FIG. 5 is a cross-sectional view of the lower case and the aspherical mirror in FIG. 3 taken along line V-V in a Y-axis direction of the aspherical mirror.

FIG. 5 is a cross-sectional view of the lower case 100 and the aspherical mirror 110 in FIG. 3 taken along line V-V in a Y-axis direction of the aspherical mirror 110.

Figure 6:
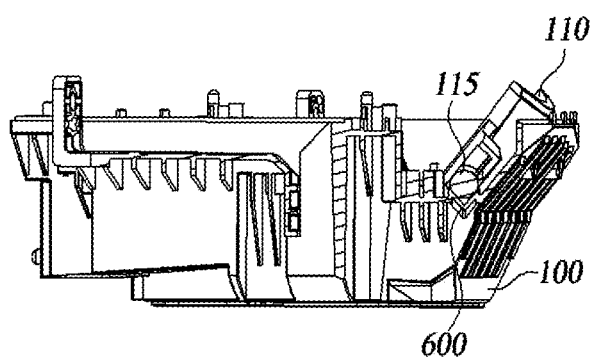
FIG. 6 is a cross-sectional view of the lower case and the aspherical mirror in FIG. 3 taken along line VI-VI in a Y-axis direction of the aspherical mirror.

FIG. 6 is a cross-sectional view of the lower case 100 and the aspherical mirror 110 in FIG. 3 taken along line VI-VI in a Y-axis direction of the aspherical mirror 110.

Referring to FIGS. 3 to 6, shapes of the plurality of reception blocks 105 correspond to the spherical mount 115 so that the clearance does not occur between the spherical mount 115 and the plurality of reception blocks 105.

In this case, it is preferable that the corresponding shape is made of a V-shaped block shape so that the spherical mount 115 can be safely seated regardless of a manufacturing tolerance. In this case, there is an effect of preventing movement of the spherical mount 115 in the Y and −Z axis directions and a rotational movement thereof in β and γ directions while minimizing the clearance with the spherical mount 115.

Meanwhile, hereinafter, in the plurality of reception blocks 105, depending on where the reception blocks 105 are located, a block located on a side of the driving unit 150 is referred to as a first reception block 500, and a block located on a side opposite to the driving unit 150 is referred to as a second reception block 600.

The plurality of reception blocks 105 includes support units 340 for supporting the spherical mounts 115, and at least one of the support units 340 of the plurality of reception blocks 105 may be formed to be inclined (inclined) in the direction of the axis of rotation of the aspherical mirror 110, that is, in the axial direction. In this case, it is preferable that the block on the opposite side of where the driving unit 150 is located, that is, the support unit 340 of the second reception block 600 is configured to be inclined toward the first reception block 500.

That is, since a left side of the first reception block 500 is in contact with an X-axis reference plane 300 of the lower case 100, the support unit 340 of the second reception block 600 may be inclined toward the first reception block 500, that is, inclined in a −X axis direction. In this case, since the aspherical mirror 110 applies a force due to gravity toward the X-axis reference plane 300, as long as an external force exceeding the force due to gravity does not act, the movement of the aspherical mirror 110 in the X-axis direction can be prevented.

However, the support unit 340 is not necessarily inclined only with respect to the second reception block 600 on the side opposite to the driving unit 150, and in consideration of the position of the driving unit 150, the position of the X-axis reference plane 300, or the like, a block to be inclined to the support unit 340 may be differently determined.

Meanwhile, the lower case 100 may include a vertical fastening groove 320 for screw-coupling with the screen 140. The vertical fastening groove 320 is integrally formed with the lower case 100, and a shape corresponding to a screw line may be formed in the vertical fastening groove 320 so that the screw can be coupled thereto. The vertical fastening groove 320 is formed in each of regions adjacent to the first and second reception blocks 500 and 600 to be coupled to both sides of the screen 140, but the number and position of vertical fastening grooves 320 are not necessarily limited thereto.

In addition, as long as the screen 140 is coupled to the lower case 100 and configured not to be separated, the lower case 100 and the screen 140 do not necessarily have to be screw-coupled together, and an internal shape of the vertical fastening groove 320 may also be easily changed according to the coupling method.

Figure 7:
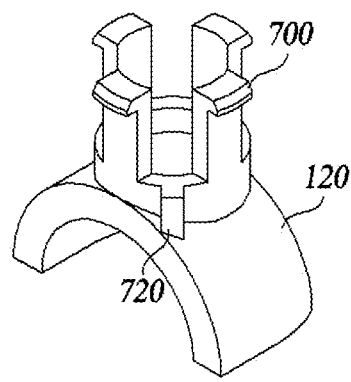
FIG. 7 is a view illustrating a shape of the mount fixing unit according to one embodiment of the present disclosure.

FIG. 7 is a view illustrating the shape of the mount fixing unit 120 according to one embodiment of the present disclosure.

In the case where the mount fixing unit 120 is coupled to the coupling hole 200 of the screen 140, when the mount fixing unit 120 is not completely fixed to the coupling hole 200, the mount fixing unit 120 cannot completely limit the displacement of the spherical mount 115. Therefore, it is preferable that the mount fixing unit 120 is fixed so as not to move and rotate with respect to the screen 140.

Accordingly, referring to FIG. 7, the mount fixing unit 120 may include a fixing hook 700 and a protruding unit 720.

The fixing hook 700 protrudes from the coupling hole 200 and prevents the mount fixing unit 120 from moving with respect to the screen 140. In FIG. 7, four fixing hooks 700 are formed at intervals of 90°, but the number of fixing hooks 700 is not necessarily limited thereto. In addition, although the fixing hooks 700 protrude from one end of the coupling hole 200, the fixing hooks 700 may protrude from a circumferential surface of the coupling hole 200.

The protruding unit 720 protrudes from one surface of the mount fixing unit 120 to prevent the mount fixing unit 120 from rotating with respect to the screen 140. In FIG. 7, the number of the protruding units 720 is one, but the number of the protruding units 720 is not necessarily limited thereto, and a plurality of protruding units 720 is also possible.

Figure 8:
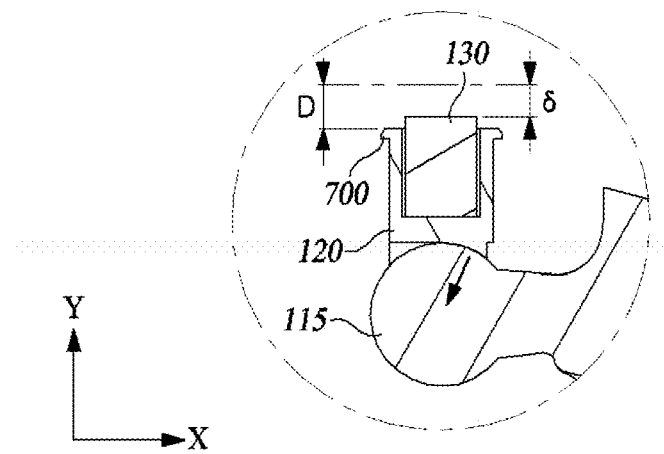
FIG. 8 is a view illustrating an example of a method of the mount fixing unit limiting a displacement of a spherical mount according to one embodiment of the present disclosure.
Figure 8:
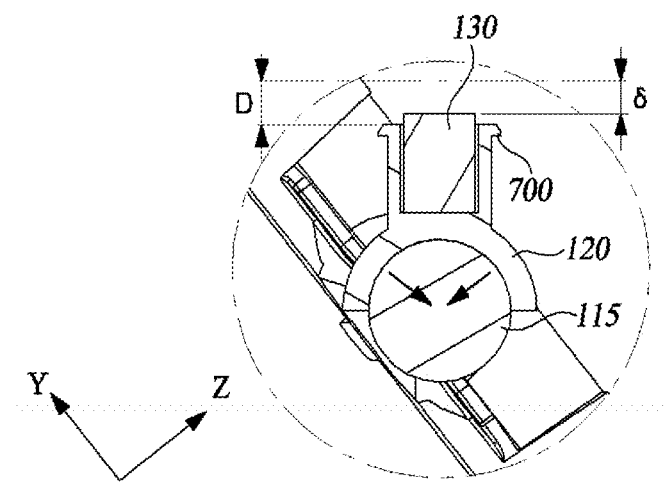

FIG. 8 is a view illustrating an example of a method of the mount fixing unit 120 limiting the displacement of the spherical mount 115 according to one embodiment of the present disclosure.

FIG. 8A is a cross-sectional view of the spherical mount 115, the mount fixing unit 120, and the compression spring 130 taken along line IV-IV in FIG. 3 in the direction of the axis of rotation of the aspherical mirror 110.

FIG. 8B is a cross-sectional view of the spherical mount 115, the mount fixing unit 120, and the compression spring 130 taken along line V-V in FIG. 3 in the Y-axis direction.

Referring to FIG. 8, the compression spring 130 is exposed by a predetermined length from the upper end of the mount fixing unit 120, and when the screen 140 to which the mount fixing unit 120 is coupled is coupled to the lower case 100, at least a portion of the exposed length of the compression spring 130 may be compressed by the push unit 220 of the screen 140. As the compression spring 130 is compressed, an elastic force is generated, and the generated elastic force acts as a fixing force that limits the displacement of the spherical mount 115. For example, the compression spring 130 is exposed as much as a length of D from the upper end of the mount fixing unit 120, and when the screen 140 is coupled to the lower case 100, the compression spring 130 is compressed by a length of δ.

The fixing force due to the compression of the compression spring 130 acts in the −X axis and −Y axis directions with respect to the spherical mount 115. In addition, referring to FIG. 8B, the fixing force caused by compression of the compression spring 130 acts in the −Y axis and −Z axis directions with respect to the spherical mount 115.

That is, the fixing force caused by compression of the compression spring 130 acts in the −X-axis, −Y-axis and −Z-axis directions with respect to the spherical mount 115. When two mount fixing units 120 are provided and each mount fixing unit 120 limits the displacement of the spherical mount 115, the fixing force may further increase.

Therefore, in the spherical mount 115 of the vehicle head-up display apparatus according to one embodiment of the present disclosure, the displacements of the spherical mount 115 in the X-axis, Y-axis, and Z-axis directions are limited by not only the plurality of reception blocks 105 but also the mount fixing unit 120 and the compression spring 130. In addition, since the rotational movements in the β and γ directions of the spherical mount 115 can be prevented by the plurality of reception blocks 105, the aspherical mirror 110 is allowed to rotate only in the α direction.

In the spherical mount of the conventional vehicle head-up display apparatus, the displacement of the screen to which a plate spring (not illustrated) is combined is coupled to the lower case, and thus the displacement of the spherical mount is limited. In this case, since lubricating oil is applied between the spherical mount and the plate spring, when a strong external force is applied in a direction other than a direction perpendicular to the plate spring, there is a problem that the spherical mount moves along the slopes of the plurality of reception blocks. When the movement of the spherical mount occurs, not only the display position of the head-up display is changed, but also noise is generated.

According to the spherical mount 115 of the vehicle head-up display apparatus according to the embodiment of the present disclosure, the above-described problem can be solved. That is, since the mount fixing unit 120 surrounds at least a portion of the spherical mount 115, by applying the fixing force in all directions regardless of the direction in which the external force is applied, the displacement of the spherical mount 115 can be limited.

In addition, in order to change a magnitude of the fixing force acting on the spherical mount 115, in the existing case, a thickness of the plate spring itself should be changed, and in order to change the thickness, a new mold should be manufactured. Accordingly, there is a problem that manufacturing costs increase. According to the vehicle head-up display apparatus according to the embodiment of the present disclosure, since it is easy to replace the compression spring 130 attached to the mount fixing unit 120, the strength of a standardized spring can be changed, and thus, it is possible to easily adjust the fixing force.

Figure 9:
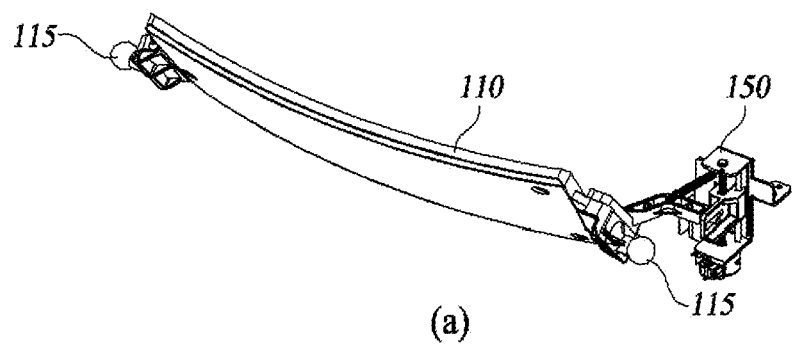
FIG. 9 is a view illustrating a vehicle head-up display apparatus in which the aspherical mirror is designed to be rotatable according to one embodiment of the present disclosure.
Figure 9:
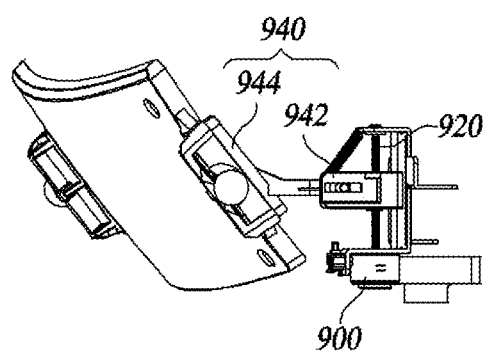

FIG. 9 is a view illustrating a vehicle head-up display apparatus in which the aspherical mirror 110 is designed to be rotatable according to one embodiment of the present disclosure.

FIG. 9A is an exploded view illustrating only the aspherical mirror 110 and the driving unit 150 in the vehicle head-up display apparatus according to one embodiment of the present disclosure.

FIG. 9B is a side view illustrating only the aspherical mirror 110 and the driving unit 150 in the vehicle head-up display apparatus according to one embodiment of the present disclosure.

Referring to FIG. 9, the driving unit 150 of the vehicle head-up display apparatus according to one embodiment of the present disclosure includes all or some of a step motor 900, a lead screw 920, and a rotation link unit 940 to rotate the aspherical mirror 110.

The step motor 900 is driven under the control of the control unit, and the lead screw 920 is connected to the step motor 900 to convert the rotational motion of the step motor 900 into linear motion. However, the driving unit 150 is not necessarily controlled by the control unit so that the aspherical mirror 110 rotates. That is, a driver may manually rotate the aspherical mirror 110 while directly viewing the height of the head-up display information.

The rotation link unit 940 is connected to the aspherical mirror 110 and the lead screw 920 so that the aspherical mirror 110 can rotate according to the driving of the step motor 900. For example, the rotation link unit 940 may include a first link 942 that move up and down according to the rotation of the lead screw 920 and a second link 944 that is connected to the first link 942 and rotates the aspherical mirror 110 according to the up-down movement of the first link 942. In this case, a groove may be formed in the first link 942 so that the second link 944 can move right and left.

Accordingly, when the driver's eye level is changed due to a change of drivers, a seat height adjustment, or the like, the control unit calculates the position of the head-up display information that matches the driver's eye level, and rotates the aspherical mirror 110 to display the head-up display information at the calculated position. The driver's eye level information may be directly input by the driver or may be automatically detected by an eye level detection device (not illustrated) separately provided in the vehicle.

Figure 10:
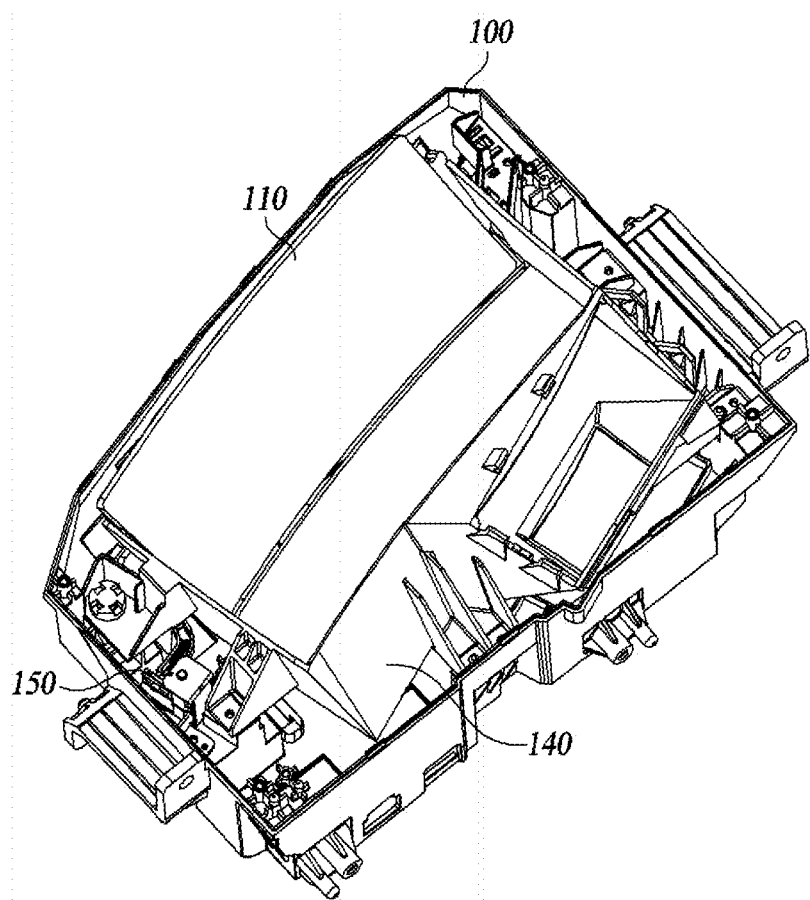
FIG. 10 is a combined perspective view of a vehicle head-up display apparatus according to one embodiment of the present disclosure.

FIG. 10 is a combined perspective view of the vehicle head-up display apparatus according to the embodiment of the present disclosure.

Referring to FIGS. 1 and 10, there is the lower case 100, and the spherical mounts 115 are formed at both ends of the aspherical mirror 110. The plurality of reception blocks 105 having a shape corresponding to the spherical mount 115 are formed on the lower case 100 to seat the spherical mount 115 so that the clearance with the spherical mount 115 does not occur. In this case, at least one support unit 340 of the plurality of reception blocks 105 may be inclined in the direction of the axis of rotation of the aspherical mirror 110. In addition, the vertical fastening groove 320 capable of being screw-coupled to the screen 140 may be formed in the lower case 100.

The coupling hole 200 to which the mount fixing unit 120 can be coupled is formed in the screen 140, and the screen 140 to which the mount fixing unit 120 is coupled is screw-coupled with the vertical fastening groove 320 so that the screen can be coupled to the lower case 100.

The driving unit 150 may be connected to the lower case 100 and the aspherical mirror 110 to rotate the aspherical mirror 110. In this case, since the mount fixing unit 120 limits the displacement of the spherical mount 115, other rotational movements and movements except for the rotational movement along the axis of the rotation of the aspherical mirror 110, that is, the X-axis do not occur.

As described above, according to the present embodiment, by fixing the axis of rotation of the aspherical mirror and optimizing the configuration for fixing the aspherical mirror, it is possible to prevent the clearance from occurring in a fixed portion of the aspherical mirror, and by reducing the total number of parts of the head-up display apparatus, it is possible to reduce costs.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A vehicle head-up display apparatus comprising:
   a lower case;
   an aspherical mirror including spherical mounts formed at each of a first end and a second end of the aspherical mirror;
   a plurality of reception blocks included in the lower case to seat the spherical mounts so that the aspherical mirror is rotatable, each reception block being formed to have a shape corresponding to each spherical mount so that a clearance with the spherical mount does not occur;
   at least one mount fixing unit surrounding at least a portion of the spherical mount in a state where the spherical mount is seated on each of the plurality of reception blocks, the at least one mount fixing unit being configured to limit a displacement of the spherical mount by a predetermined fixing force; and
   a screen including a coupling hole configured to couple with the mount fixing unit and coupled to the lower case.

2. The vehicle head-up display apparatus of claim 1, wherein at least one of the plurality of reception blocks includes a support unit that is inclined in a direction of an axis of rotation of the aspherical mirror.

3. The vehicle head-up display apparatus of claim 1, wherein the shape corresponding to the spherical mount is a V'-shaped block shape.

4. The vehicle head-up display apparatus of claim 1, further comprising a compression spring attached to the at least one mount fixing unit and configured to be compressed when the screen is coupled to the lower case,
   wherein the displacement of the spherical mount is limited using an elastic force generated when the compression spring is compressed.

5. The vehicle head-up display apparatus of claim 4, wherein displacements of the spherical mount in X-axis, Y-axis, and Z-axis directions are limited by the plurality of reception blocks and the at least one mount fixing unit.

6. The vehicle head-up display apparatus of claim 1, wherein the at least one mount fixing unit includes a fixing hook protruding from the coupling hole to prevent the fixing unit from moving with respect to the screen.

7. The vehicle head-up display apparatus of claim 1, wherein the at least one mount fixing unit includes a protruding unit protruding from one surface of the at least one mount fixing unit to prevent the at least one mount fixing unit from rotating with respect to the screen.

8. The vehicle head-up display apparatus of claim 1, wherein the lower case includes a vertical fastening groove for screw-coupling with the screen.

9. The vehicle head-up display apparatus of claim 1, further comprising:
   a driving unit connected to the lower case and the aspherical mirror and configured to rotate the aspherical mirror; and
   a control unit configured to control the driving unit to change a display position of head-up display information.

10. The vehicle head-up display apparatus of claim 9, wherein the driving unit includes:
    a step motor configured to be driven according to control of the control unit;
    a lead screw connected to the step motor and configured to convert rotational motion of the step motor into linear motion; and
    a rotation link unit connected to the aspherical mirror and the lead screw and configured to rotate the aspherical mirror.

11. A method of manufacturing a vehicle head-up display apparatus, the method comprising:
    forming spherical mounts at each of a first end and a second end of a spherical mirror so that the aspherical mirror is attached to a lower case and rotatable;
    forming, in the lower case, a plurality of reception blocks each having a shape corresponding to each spherical mount so that a clearance with the spherical mount does not occur;
    seating the spherical mounts on the plurality of reception blocks;
    coupling at least one mount fixing unit surrounding at least a portion of the spherical mount, in a state where the spherical mount is seated on each of the plurality of reception blocks to limit a displacement of the spherical mount by a predetermined fixing force, to a coupling hole provided in a screen; and
    coupling the screen coupled to the at least one mount fixing unit to the lower case.

12. The method of claim 11, wherein the forming of the plurality of reception blocks having the shape corresponding to the spherical mount so that the clearance with the spherical mount does not occur includes forming at least one support unit of the plurality of reception blocks so that the at least one support unit is inclined in a direction of an axis of rotation of the aspherical mirror.

13. The method of claim 11, wherein, in the forming of the plurality of reception blocks having the shape corresponding to the spherical mount so that the clearance with the spherical mount does not occur, the shape corresponding to the spherical mount is a 'V'-shaped block shape.

14. The method of claim 11, wherein the coupling of the screen coupled to the at least one mount fixing unit to the lower case includes compressing a compression spring attached to the at least one mount fixing unit when the screen is coupled to the lower case, and
    the at least one mount fixing unit limits the displacement of the spherical mount using an elastic force generated when the compression spring is compressed.

15. The method of claim 11, wherein the coupling of the at least one mount fixing unit configured to limit the displacement of the spherical mount by the predetermined fixing force to the coupling hole provided in the screen includes prevent the at least one mount fixing unit from moving with respect to the screen by using a fixing hook included in the mount fixing unit and protruding from the coupling hole.

16. The method of claim 11, wherein the coupling of the at least one mount fixing unit configured to limit the displacement of the spherical mount by the predetermined fixing force to the coupling hole provided in the screen includes preventing the at least one mount fixing unit from rotating with respect to the screen by using a protruding unit protruding from one surface of the at least one mount fixing unit.

17. The method of claim 11, wherein the coupling of the screen coupled to the at least one mount fixing unit to the lower case includes screw-coupling the screen to a vertical fastening groove included in the lower case.

* * * * *